(12) United States Patent
Gokavi et al.

(10) Patent No.: US 12,060,905 B2
(45) Date of Patent: Aug. 13, 2024

(54) FASTENERS

(71) Applicant: ILLINOIS TOOL WORKS INC., Glenview, IL (US)

(72) Inventors: Mahantesh Gokavi, Pune (IN); Abhishek Karambelkar, Pune (IN)

(73) Assignee: Illinois Tool works Inc., Glenview, IL (US)

( * ) Notice: Subject to any disclaimer, the term of this patent is extended or adjusted under 35 U.S.C. 154(b) by 237 days.

(21) Appl. No.: 17/727,184

(22) Filed: Apr. 22, 2022

(65) Prior Publication Data

US 2022/0341457 A1 Oct. 27, 2022

(30) Foreign Application Priority Data

Apr. 23, 2021 (IN) .............................. 202121018922

(51) Int. Cl.
*F16B 33/02* (2006.01)
*F16B 5/02* (2006.01)
*F16B 37/06* (2006.01)

(52) U.S. Cl.
CPC ................ *F16B 33/02* (2013.01); *F16B 5/02* (2013.01); *F16B 37/061* (2013.01)

(58) Field of Classification Search
CPC .. F16B 5/02; F16B 5/065; F16B 19/10; F16B 19/1081; F16B 19/109; F16B 21/084; F16B 21/086; F16B 33/02; F16B 37/061
USPC .................................. 411/383, 502, 508–510
See application file for complete search history.

(56) References Cited

U.S. PATENT DOCUMENTS

| | | | | |
|---|---|---|---|---|
| 4,431,355 A | * | 2/1984 | Junemann | F16B 19/1081 411/360 |
| 4,787,795 A | * | 11/1988 | Kraus | F16B 21/086 411/510 |
| 4,981,310 A | * | 1/1991 | Belisaire | F16B 21/086 285/194 |
| 5,669,731 A | * | 9/1997 | Hironaka | F16L 3/137 403/392 |
| 7,073,230 B2 | * | 7/2006 | Boville | B60R 13/0206 411/509 |
| 2002/0131846 A1 | * | 9/2002 | Kojima | F16B 21/086 411/508 |
| 2005/0260060 A1 | * | 11/2005 | Zoubek | F16B 21/086 411/508 |
| 2007/0241256 A1 | * | 10/2007 | Stigler | B60R 13/0206 248/423 |
| 2007/0272807 A1 | * | 11/2007 | Takagaki | B60R 16/0215 248/71 |
| 2017/0291558 A1 | * | 10/2017 | Meyers | B60R 13/0243 |

* cited by examiner

*Primary Examiner* — Roberta S Delisle
(74) *Attorney, Agent, or Firm* — Quarles & Brady LLP

(57) ABSTRACT

A fastener has a head and a shank coupled to the head and extending along a central axis of the fastener. A plurality of engagement members are disposed on a peripheral surface of the shank and connected to the shank at a point of connection to project away from the shank. The plurality of engagement members can collectively act as external threads and are flexible with respect to the shank to be relatively moveable with respect to the shank.

10 Claims, 15 Drawing Sheets

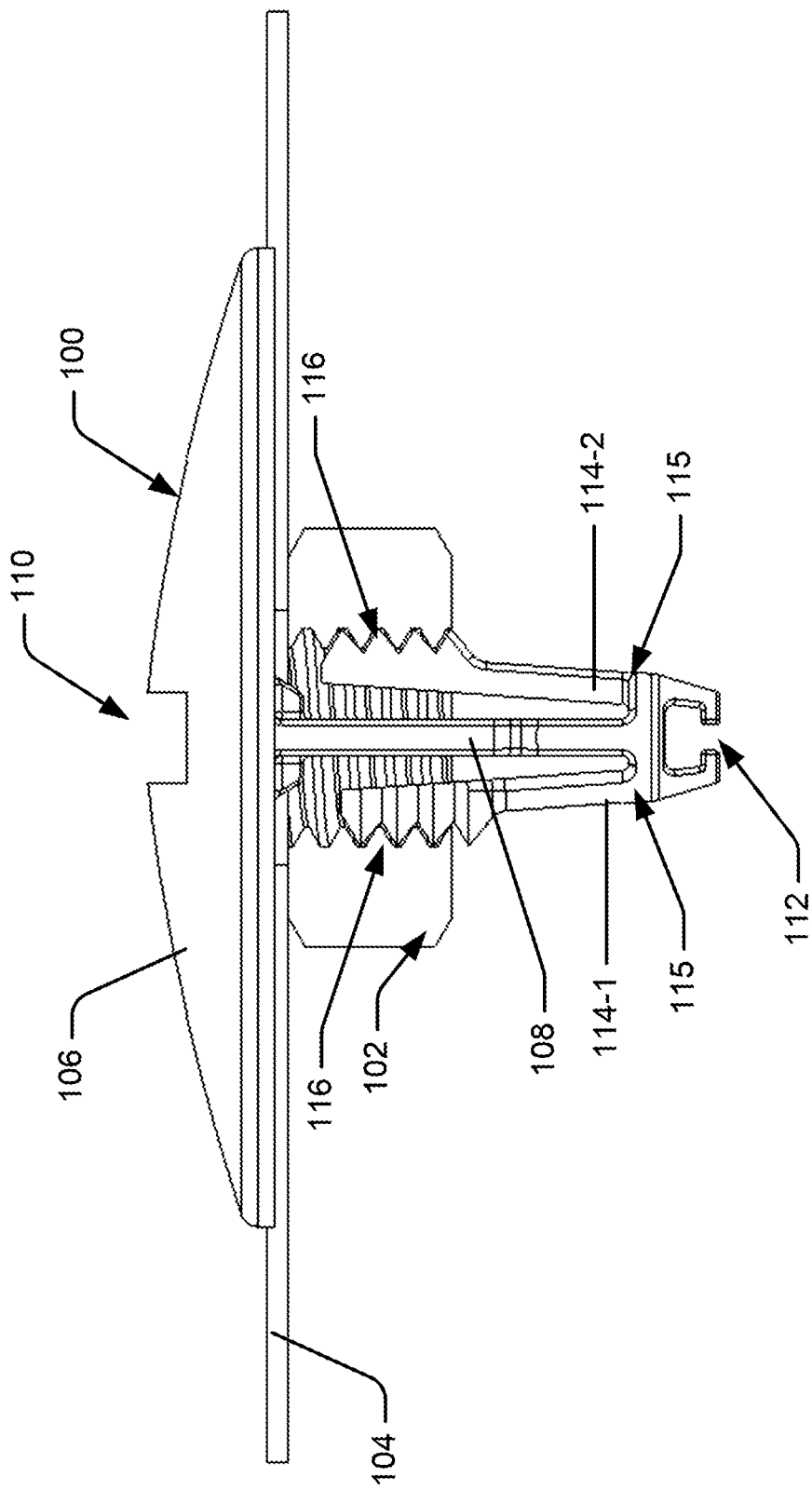

FASTENERS

CROSS REFERENCES TO RELATED APPLICATIONS

This application claims the benefit of Indian Patent Application No. 202121018922, filed on Apr. 23, 2021, which is incorporated herein by reference in its entirety.

BACKGROUND

Various types of fasteners are used for fastening components. For example, in case of an instrument panel of a vehicle, fasteners may be used to fix together adjacent panels or to secure one or more objects on the panels. One such type of fasteners is usable with holes of different types, sizes, and shapes provided in the components to be secured together. In other words, for such a fastener to fasten the components, at least one of the components is provided with a hole. One of the components is mounted on the fastener and other component having the hole receives the fastener-component assembly.

BRIEF DESCRIPTION OF FIGURES

The detailed description is provided with reference to the accompanying figures. It should be noted that the description and the figures are merely examples of the present subject matter and are not meant to represent the subject matter itself.

FIGS. 1A, 1B, 1C-1, 1C-2, and 1D illustrate various examples of assembled states of a fastener with a threaded element and a component, according to an example of the present subject matter.

Figure 1B:
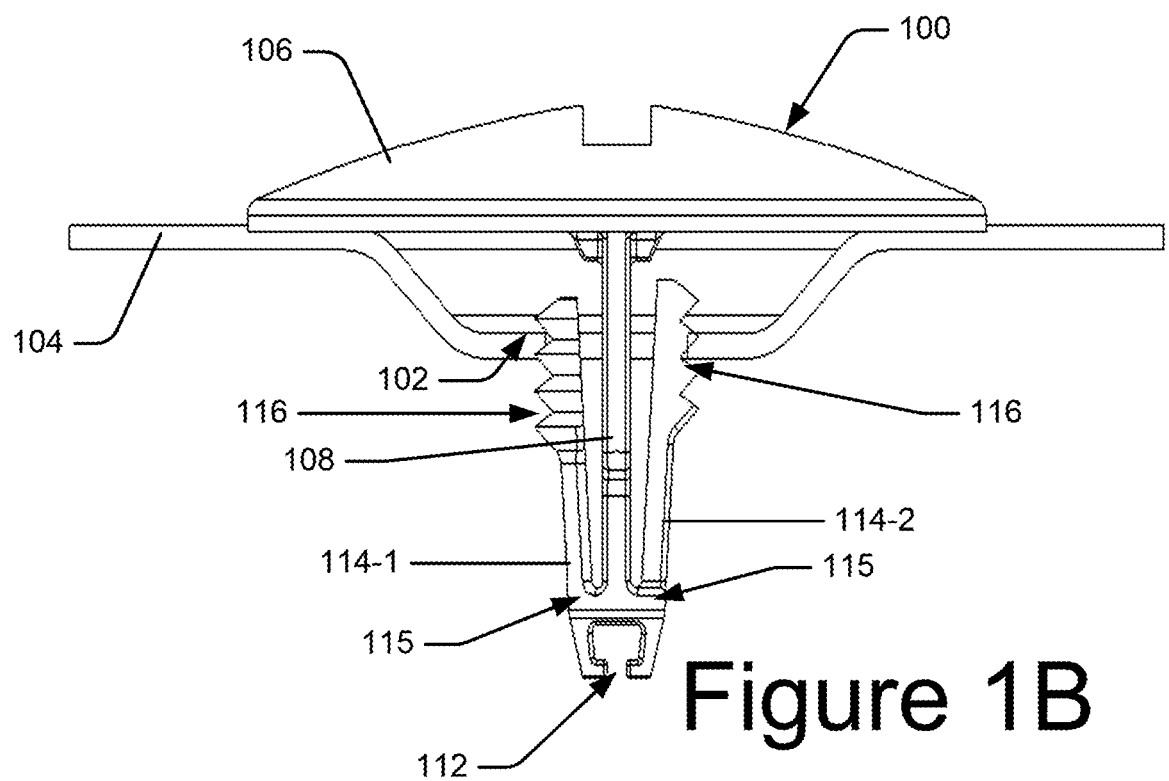

Throughout the drawings, identical reference numbers designate similar, but not necessarily identical, elements. The figures are not necessarily to scale, and the size of some parts may be exaggerated to more clearly illustrate the example shown. 'Moreover, the drawings provide examples and/or implementations consistent with the description; however, the description is not limited to the examples and/or implementations provided in the drawings.

DETAILED DESCRIPTION

Fasteners used for mounting a component to another component having a hole are widely used. One component is mounted to the fastener, the assembly referred to as a mounted fastener and a hole in the other component receives the mounted fastener which joins the two components. In few cases, the other component may not have a hole but may have an element separately provided which acts as a hole. In such a case, for instance, components may have a nut welded thereto and the nut, referred to as a weld nut, may be used for mounting one component to the other. For example, if a grill is to be fixed to the body of the vehicle, the body panel may have the weld nuts (welded thereto) and screws may be used to mount the grill to the body panel by fastening to the weld nuts.

Further, in certain cases, one component provided with the element, such as the weld nut, may be such that the second component may be an accessory which may be assembled to the component's element by an end customer. For instance, the second component may be an after-market accessory that the end customer may procure separately and assembly with the component at the weld nut. In such a case, the portion of the element, such as the weld nut, may remain accessible to allow fixing of the components, for example, the accessories, thereto and may, therefore, be exposed to the elements of nature and may gather dust and grime. As a result, the element may corrode, and the service life of the element may be low. Therefore, to protect the element, the opening has to be protected by using a cap or another similar part.

Such caps are usually limited in design by a degree of ease or difficulty with which the cap can be deployed in and, accordingly, be withdrawn from the hole in the component. In other words, the design of the caps is such that if they are easily deployed, they can be easily, and sometimes inadvertently, withdrawn, or if they are to be made difficult to be withdrawn, they are difficult to deploy. Accordingly, the parts which are designed to be ergonomically viable may be found to be lacking in adequately holding the components together, whereas the parts which are capable of properly holding the components together may not be ergonomic in use. At the same time, the durability of such parts is considerably low, for example, in being reused by being disassembled, during which the cap may be irreparably damaged.

Examples of a fastener for covering a threaded element are described herein. The threaded element can, for example, be a weld nut (i.e., a nut welded to a component, such as a body panel, or a hole formed in the body panel with profile as simple as plane hole or having a threaded profile/shape. According to an aspect, the fastener is so designed to be easily engaged with low force and conveniently disengaged even by an end customer who might not possess the skills of a workshop mechanic. In other words, the fastener is designed such that the engagement and disengagement of the fastener is easy and does not require skill or considerable effort. At the same time, the fastener is designed in such a manner that it is capable of withstanding large number of engagement and disengagement cycles without being damaged. Therefore, the fastener, in accordance with the present subject matter, is reusable over a considerable number cycles of assembly and disassembly.

In addition, the present subject matter involves designing the fastener in such a manner that the fastener is ergonomic in terms of being inserted into the hole in the threaded element, whereas at the time of separation or withdrawal from the hole, the fastener may involve a considerably large amount of force in comparison to that for insertion. In other words, the fastener is designed to have a low insertion force but to have a high separation force.

The fastener can include a head and a shank connected to the head. The shank can be formed as a central shaft member of the fastener and can be inserted into the threaded element for engaging the fastener therewith. At an end of the shank opposite to the end at which the head is provided, i.e., the end opposite to the head end and referred to as a nose of the fastener, the shank can be provided with a plurality of limbs. Each limb can be cantilevered to the shank at the nose and extend towards the head while running substantially parallel to the shank. Accordingly, each limb may be hingeable about a point of connection to the shank. The nose of the fastener can be formed as being tapered for inserting the fastener into the hole in the threaded element.

A plurality of engagement members can be disposed on a peripheral surface of the shank, the engagement members designed in the shape of or to act has external threads on the shank so as to engage with the internal threads of the threaded element in the assembled state of the fastener with the threaded element. According to an aspect, the fastener can be designed as having the engagement members which can be flexible with respect to the internal threads of the threaded element. For instance, in one case, the shank can include the limbs which can flex with respect to the shank, as mentioned above, and the engagement members can be fixed onto or provided on the limbs such that the movement of the limbs can cause relative motion between the engagement members and the threaded element during assembly and disassembly. In another case, the limbs of the fastener may be substantially inflexible and the engagement members may be connected to the limbs such that the engagement members can flex with respect to their points of connection to the limbs of the fastener to allow relative movement between the engagement members and the threaded element. In the present case, in another example, the fastener may not have limbs and, instead, the engagement members can be directly provided on the shank and can flex with respect to the point of connection at the shank. In yet another case, the engagement members can flex with respect to the limbs on which they are provided as well as the limbs can flex with respect to the shank of the fastener, so as to provide a greater degree of flexibility and movement between the engagement members and the threaded element.

Therefore, as mentioned above, the fastener can include engagement members which are adapted to flex with respect to a shank of the fastener, such that the engagement members can exhibit relative motion with respect to the internal threads of the threaded element during assembly and disassembly of the fastener with respect to the threaded element. For example, such a design provision allows the fastener to be assembled and disassembled over multiple cycles without damaging the fastener, for instance, the engagement members of the fastener.

In addition, the fastener can also have features that can determine the insertion as well as separation force for the fastener, i.e., the force to be applied on the fastener for withdrawing the fastener from the threaded element. According to an aspect, the point of connection of the flexible part of the fastener, i.e., the limbs or the engagement members or both, at the respective portions can be designed based on the insertion force and the separation force for which the fastener is designed. In other words, the insertion and separation forces can be subject to the design of the engagement members or the limbs or both of the fastener. In an example, a size of the point of connection of the engagement members or the limbs or both can be selected based on the separation force and/or the insertion force for the fastener. For instance, a width or thickness or both of the point of connection, when high, can reduce a flexibility, and therefore, the hingeability, of the flexible part, thereby requiring a high insertion and/or separation force for removing the fastener from the threaded element. However, the size of the points of connection can be determined based on a trade-off between the separation force and the failure of the fastener. In one example, the size of the points of connection can be decided based on a material of the fastener, duly considering the above discussed factors in addition. Further, the fastener can be designed in a way that the insertion force and the separation force for the fastener can be independently controlled. In other words, the design of the fastener is such that the insertion force of the fastener has no bearing on the separation force of the fastener and vice-versa.

The above aspects are further illustrated in the figures and described in the corresponding description below. It should be noted that the description and figures merely illustrate principles of the present subject matter. Therefore, various arrangements that encompass the principles of the present subject matter, although not explicitly described or shown herein, may be devised from the description and are included within its scope. Additionally, the word "coupled" is used throughout for clarity of the description and may include either a direct connection or an indirect connection.

Figures 1, 1C:
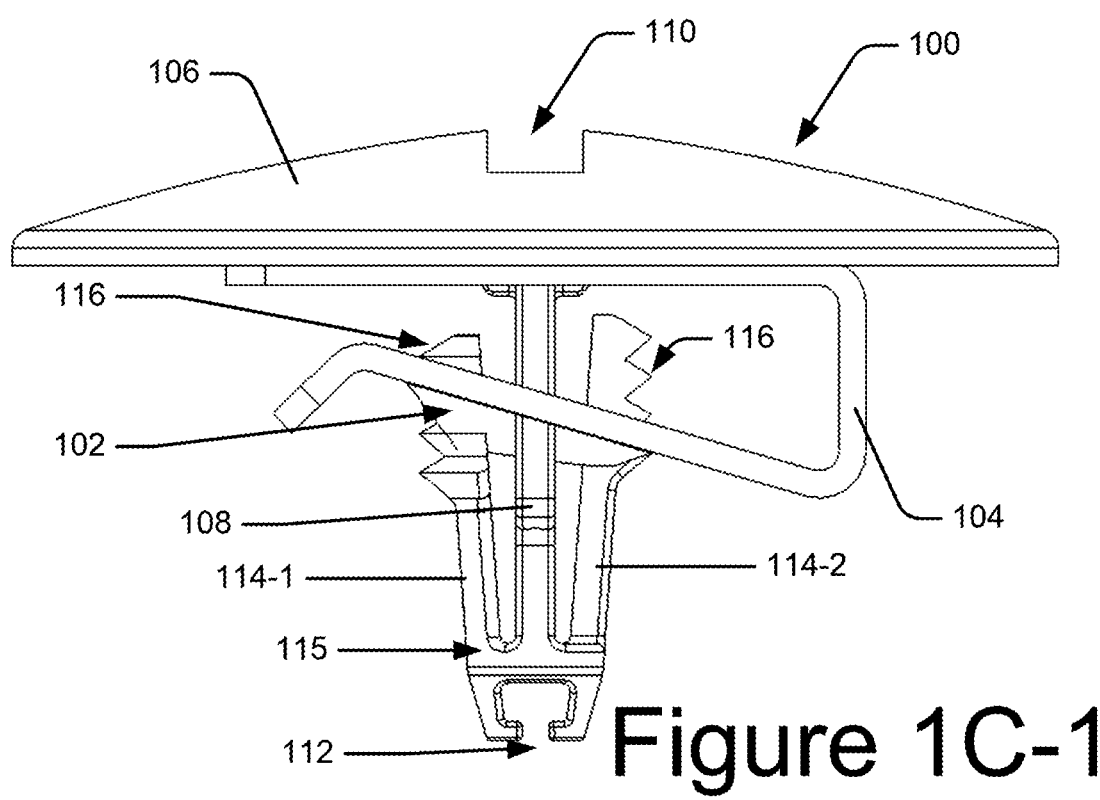
Figures 1, 1C, 2:
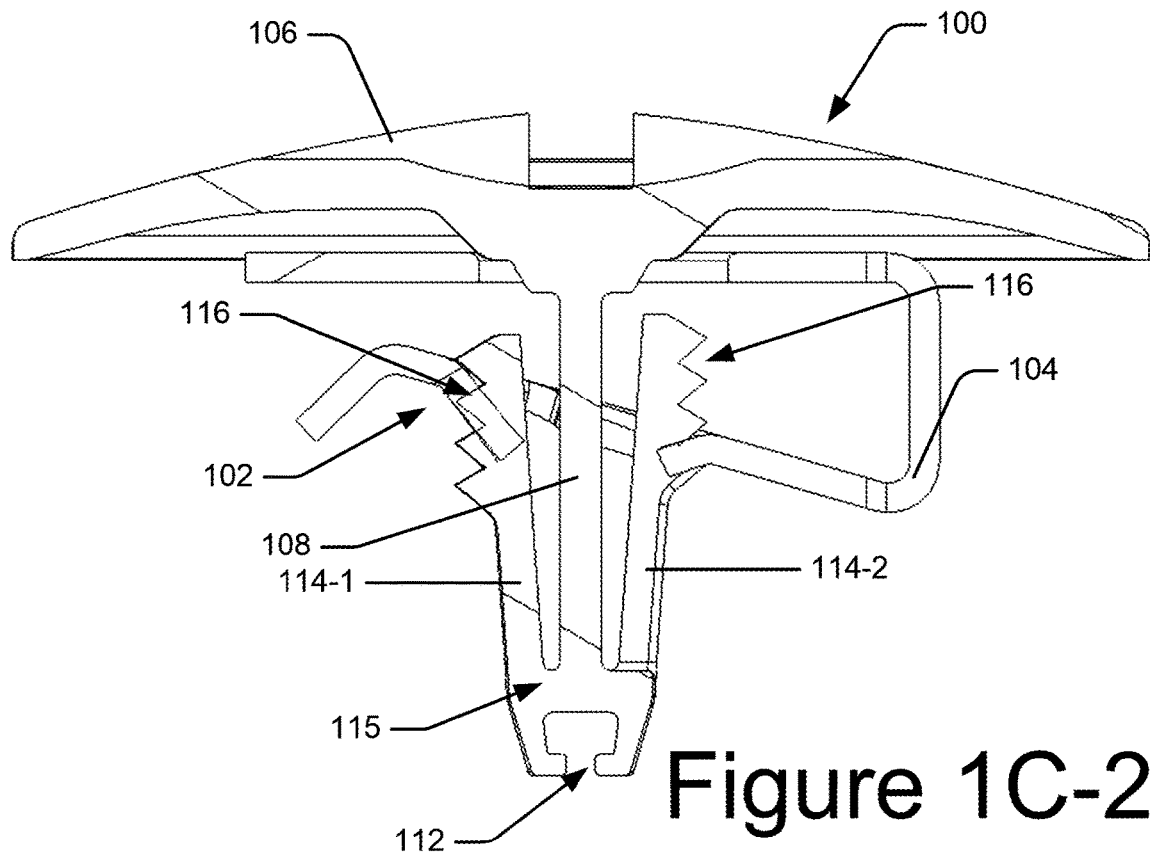

FIG. 1A illustrates a fastener 100 in an assembled condition to secure an opening of a threaded element 102, the threaded element 102 fixed to component 104, according to an example of the present subject matter. FIG. 1 illustrates a cut cross-sectional view of the fastener 100 in the assembled state with the threaded element 102 and the component 104.

Figure 1D:
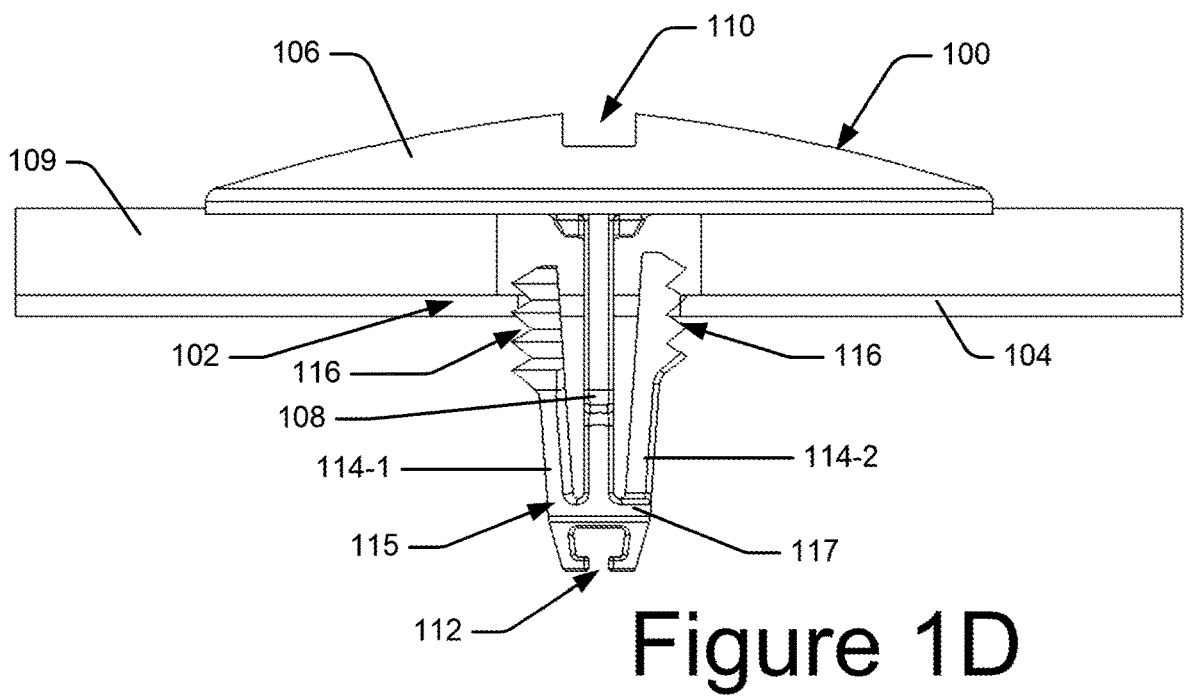

The fastener 100 can include a head 106 and a shank 108 connected to the head 106. The shank 108 can be formed as a central shaft member of the fastener 100, i.e., extends along a central axis of the fastener 100, and can be inserted into the threaded element 102 for engaging the fastener therewith. The threaded element 102 can be, for example, a weld nut, welded to the component 104, and can include internal threads, which can engage with the fastener 100. In other examples, as shown in FIG. 1B, FIG. 1C-1, and FIG. 1C-2, the threaded element 102 can be the component 104, such as the body panel, itself with a hole formed in the body panel. In such a case, the hole can have a profile of a plane hole or may have a threaded profile and can act as the threaded element 102. For instance, as shown in FIG. 1C-1 (side view) and FIG. 1C-2 (cut cross-sectional view), the body panel 104 can be bent in the form of a u-shape to form a u-nut which can act as the threaded element 102. In one other example, as shown in FIG. 1D, the component 104, such as the metal body panel, can act as the threaded element 102 by virtue of the threaded or plane hole formed therein. In addition, a secondary component 109, such as a headliner, may be provided as sandwiched between the head 106 of the fastener 100 and the component 104.

Further, in an example, the threaded element 102 and the component 104, such as a body panel of a vehicle, can be made of sheet metal whereas the fastener 100 can be made of plastic material. In said example, the fastener can be made of a material including polypropylene (PP), Polyamide (PA), acrylonitrile butadiene styrene (ABS), polycarbonate (PC), polymethylmethacrylate (PMMA), polyoxymethylene (POM), or a combination thereof.

At an end of the shank 108 opposite to the end at which the head 106 is provided, i.e., the end opposite to the head end 110 and referred to as a nose 112 of the fastener 100, the shank 108 can be provided with a plurality of limbs 114-1 and 114-2. Each limb 114-1, 114-2 can be cantilevered to the shank 108 at the nose 112 and can extend towards the head 106 while running substantially parallel to the shank 108 and being substantially equidistant from each other about the shank 108. Accordingly, each limb 114-1, 114-2 may be hingeable about a point of connection 115 to the shank 108. The nose 112 of the fastener 100 can be formed as being tapered for inserting the fastener 100 into the hole in the threaded element 102. In one example, the shank 108 may include, in proximity of the nose 112, a base portion 117 at which the limbs 114-1 and 114-2 can be connected to the shank 108. In said example, the base portion 117 may be wider or thicker than the shank 108 and may provide for adequate connection of the limbs 114-1 and 114-2.

The shank 108 can be provided with a plurality of engagement members 116 on its peripheral surface and extending away from the shank 108. Further, the engagement members 116 are designed in the shape of or to collectively act as external threads on the shank 108 so as to engage with the internal threads of the threaded element 102 in the assembled state of the fastener 100 with the threaded element 102. In said example, a pitch of the engagement members 116 on the shank 108 can be substantially same as a pitch of the internal threads of the threaded element 102. In other words, the distance between two adjacent engagement members 116 on the shank 108 is about the same as the distance between adjacent threads on the threaded element 102. According to an aspect, the fastener 100 can be designed as having the engagement members 116 which can flex with respect to shank 108 and be relatively moveable with respect to the shank 108, such that the engagement members 116 can flex with respect to the internal threads of the threaded element 102 during assembly and disassembly. For instance, the engagement members 116 can be in two diametrically opposite sets on the peripheral surface of the shank 108.

In another case, the plurality of engagement members 116 can be disposed on the peripheral surface of each of the limbs 114-1 and 114-2 and the limbs 114-1 and 114-2 can flex with respect to the shank 108 of the fastener 100. The engagement members 116 can be fixed onto the limbs 114-1, 114-2 such that the movement of the limbs 114-2, 114-2 can cause relative motion between the engagement members 116 and the threaded element 102 during assembly and disassembly.

In yet another case, the limbs 114-1, 114-2 of the fastener 100 may be substantially inflexible and the engagement members 116 may be connected to the limbs 114-1, 114-2 such that the engagement members 116 can flex with respect to their points of connection 119 to the limbs 114-1, 114-2 of the fastener 100 to allow relative movement between the engagement members 116 and the threaded element 102. In such a case, in another example, the fastener 100 may not have limbs 114-1, 114-2 and, instead, the engagement members 116 can be directly provided on the shank 108 and can flex with respect to the point of connection at the shank 108.

In one other case, the engagement members 116 can flex with respect to the limbs 114-1, 114-2 on which they are provided as well as the limbs 114-1, 114-2 can flex with respect to the shank 108 of the fastener 100. Therefore, in other words, the engagement members 116 as well as the limbs 114-1, 114-2 can flex or move with respect to the shank 108 so as to provide a greater degree of flexibility and movement between the engagement members 116 and the threaded element 102. The various embodiments of the fastener 100 and its engagement members 116 are shown in FIGS. 2A to 5B.

Figure 2A:
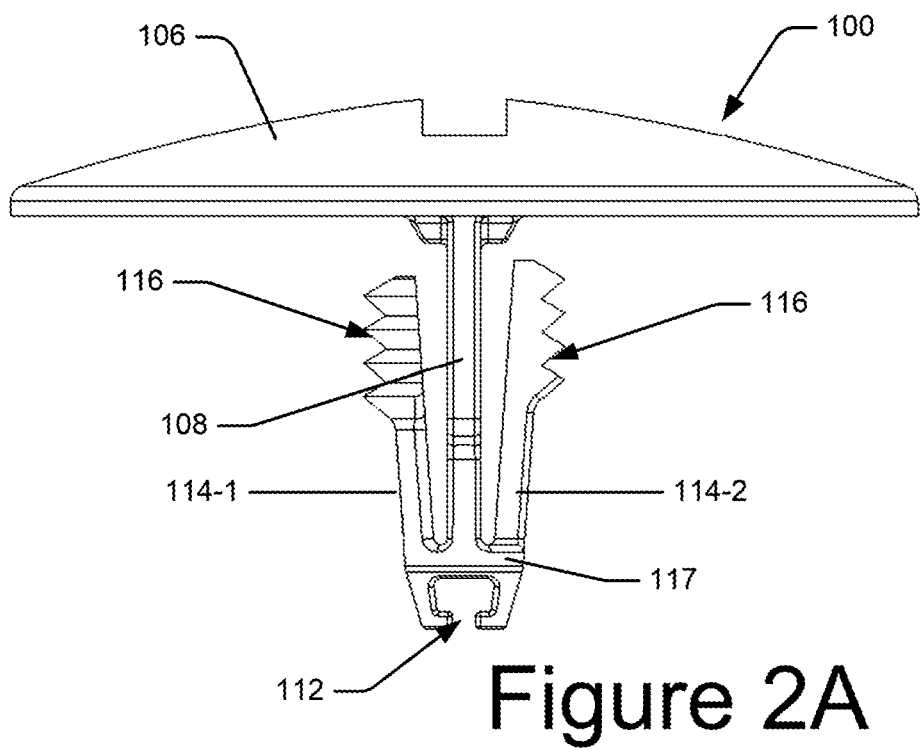
FIGS. 2A, 2B, 2C, 2D, 2E, 3A, 3B, 4A, 4B, 4C, 5A, 5B, and 5C illustrate various examples of the fastener of the present subject matter.
Figure 2B:
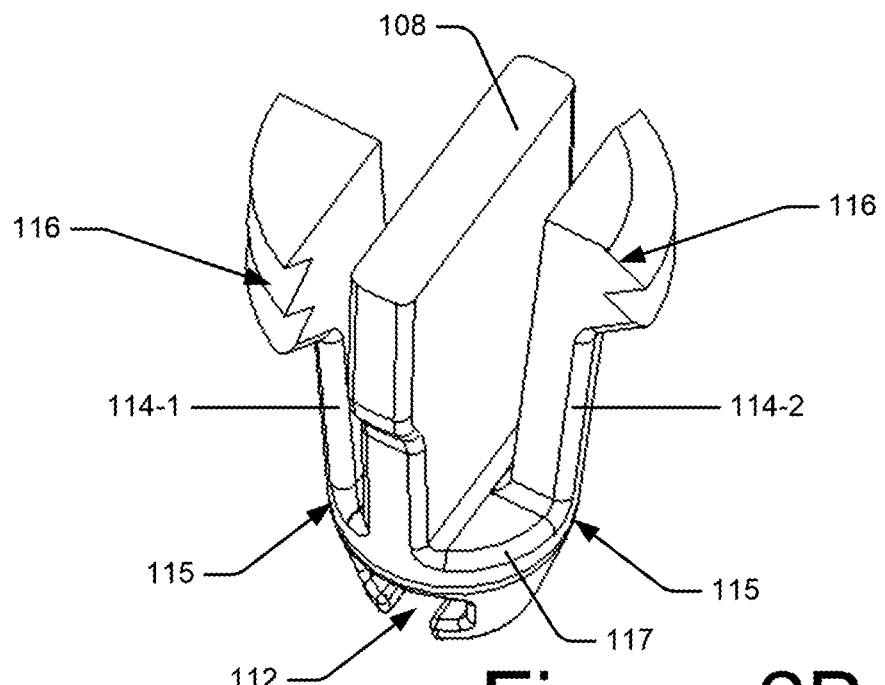
Figure 2C:
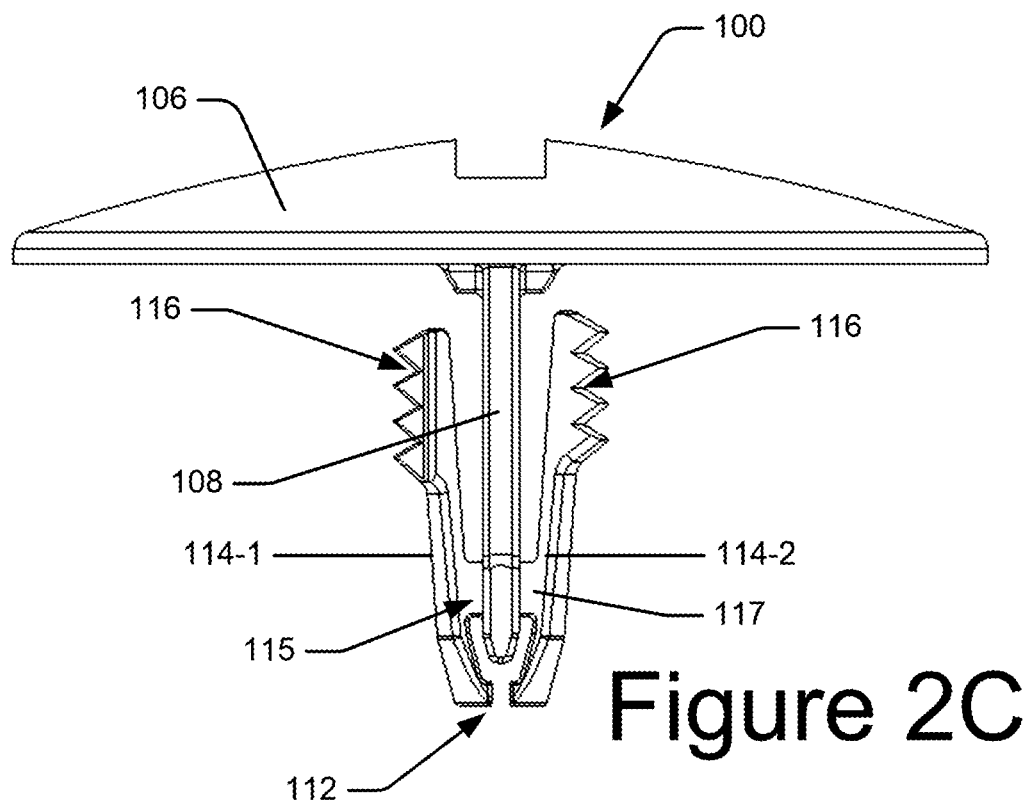
Figure 2D:
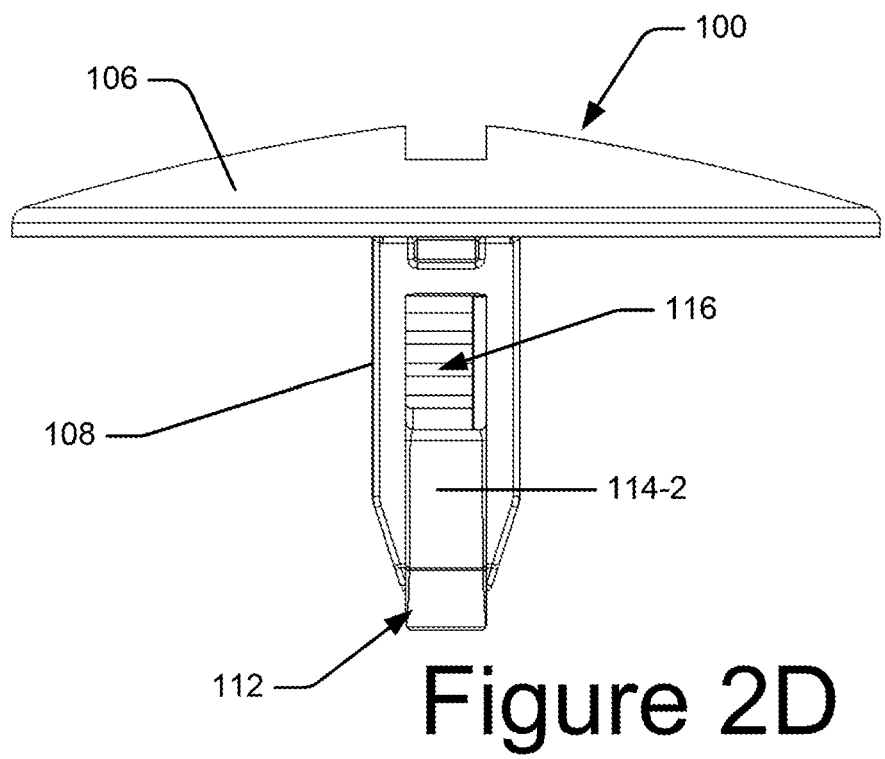
Figure 2E:
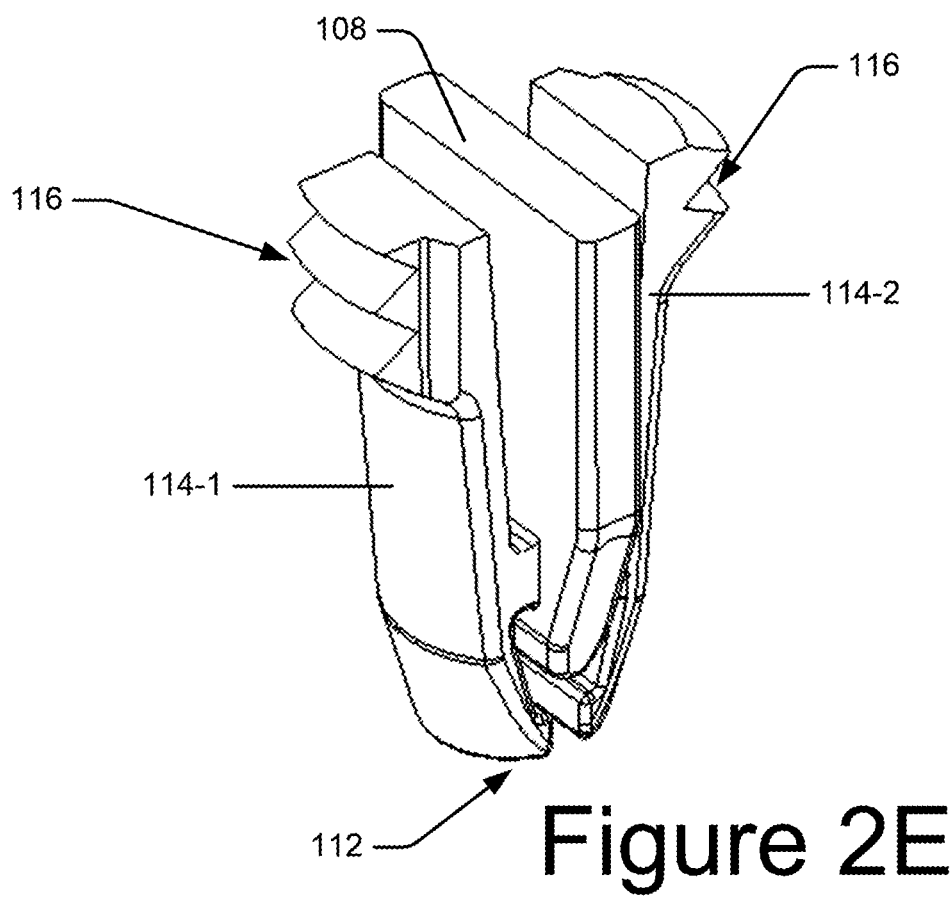

FIGS. 2A, 2B, 2C, 2D, and 2E illustrate the fastener 100, according to a first example of the present subject matter. In the present case, the limbs 114-1, 114-2 are connected at the nose 112 and can flex with respect to the shank 108. The engagement members 116 can be formed as external threads which match the shape, curvature, and pitch of the internal threads of the threaded element 102. For instance, the engagement members 116 are provided on the external surface of the limbs 114-1, 114-2 and can be formed as a sector-shaped threads on the external surface of the limbs 114-1, 114-2. In said example, the engagement members 116 on one limb 114-1 are diametrically opposite to the engagement members 116 on the other limb 114-2. Further, as an example, FIGS. 2C, 2D, and 2E illustrate an embodiment of the fastener 100 in which the shank 108 is extended at the nose 112 to beyond the point of connection 115 of the limbs 114-1, 114-2, in contrast to the embodiment shown in FIGS. 2A and 2B in which the shank 108 does not extend beyond the point of connection 115 of the limbs 114-1, 114-2.

Figure 3A:
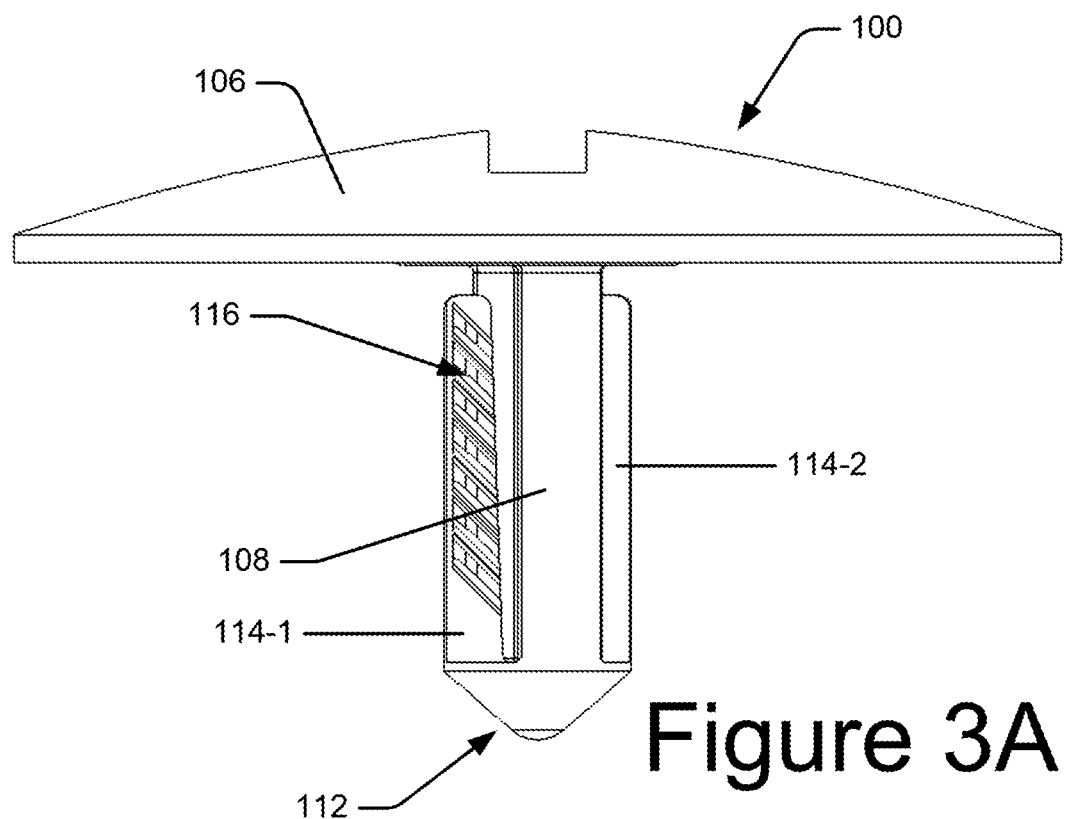
Figure 3B:
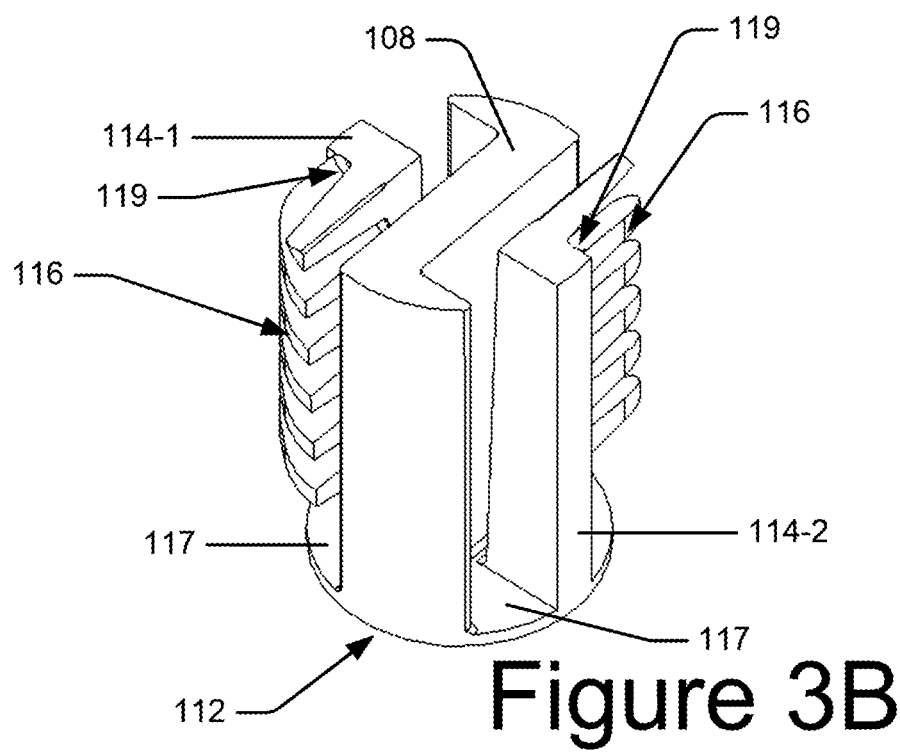

FIGS. 3A and 3B illustrate the fastener 100, according to a second example of the present subject matter. In said example, the engagement members 116 can be provided as floating fins or cantilevered fins on the shank 108, i.e., on the limbs 114-1, 114-2 of the shank 108 and can flex with respect to the point of connection 119. The engagement members 116 can extend in the direction of the head 106 and can form an inverted tree structure. In said example, the engagement members 116 can be diagonally offset with respect to each other in the tree structure. In other words, the engagement members 116 on one limb 114-1 can be provided in a diagonally offset configuration with respect to the engagement members 116 on the other limb 114-2 when viewed in a cross-sectional view. Accordingly, in said example, the engagement members 116 on one limb 114-1 can face or extend in one direction, as shown in FIG. 3B, whereas the engagement members 116 on the other limb 114-2 can face or extend in the opposite direction, while their points of connection 119 are offset from each other with respect to the center when viewed in the cross-sectional view. In said example, the shank 108 can have an S-shaped cross section which provides enhanced strength and durability to the shank 108.

Figure 4A:
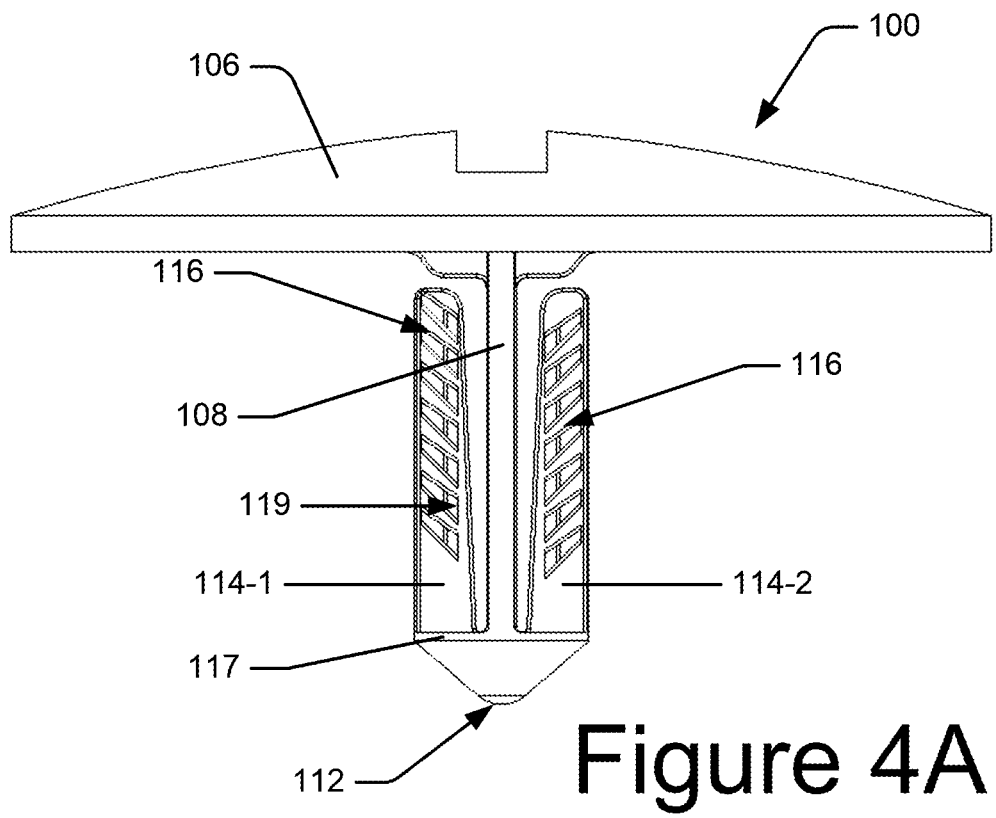
Figure 4B:
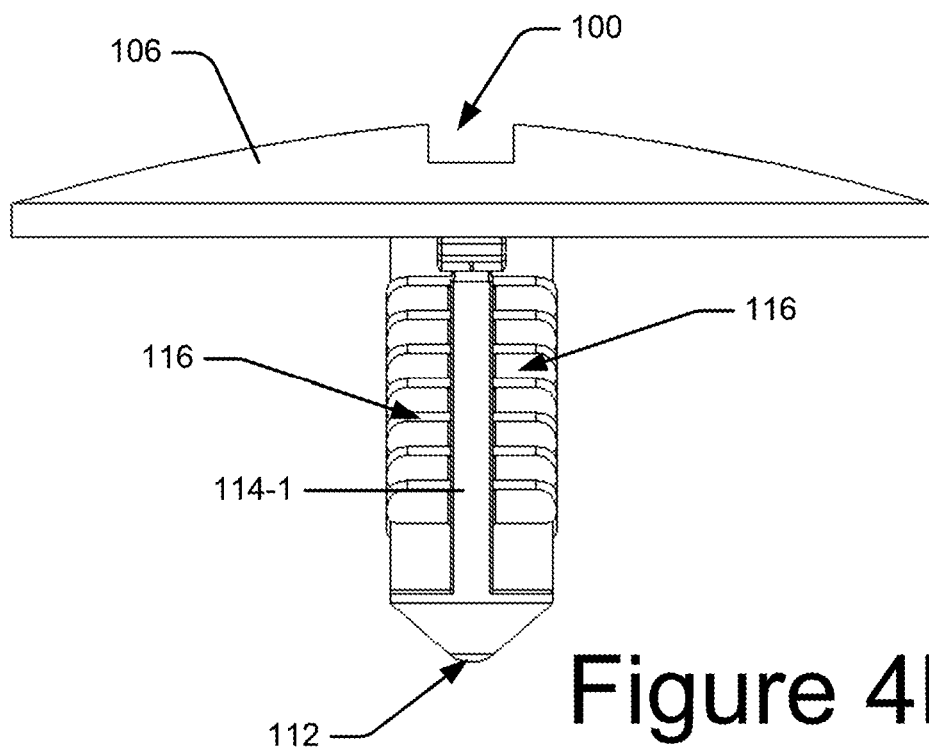
Figure 4C:
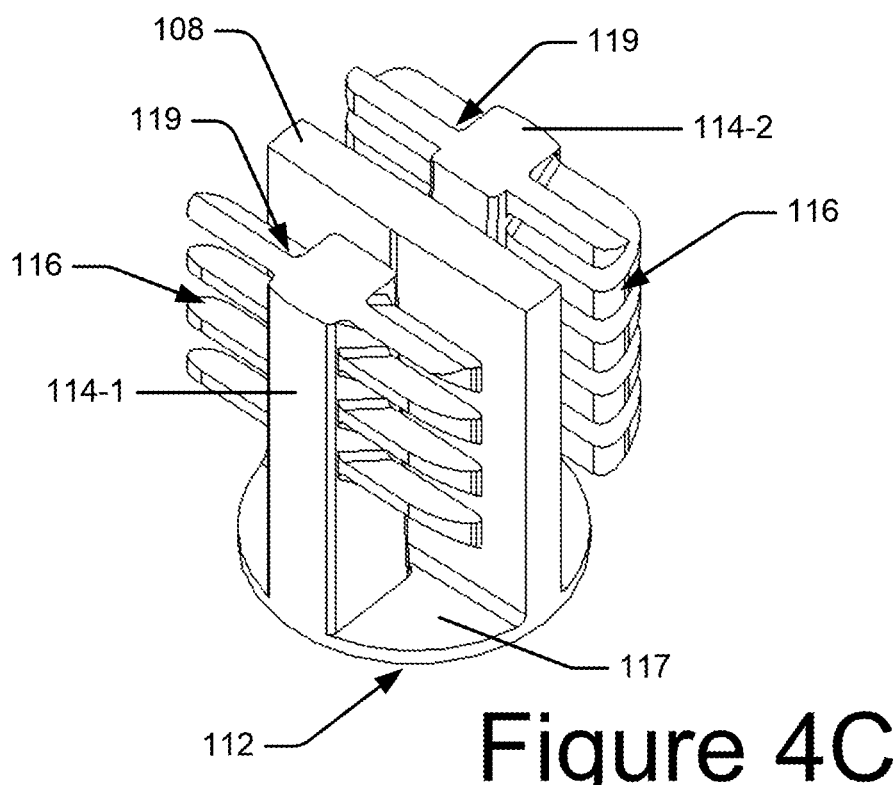

FIGS. 4A, 4B, and 4C illustrate a third example of the fastener 100 of the present subject matter, in which the engagement members 116 can be in the form of the inverted tree structure but parallel to each other (and not diagonally offset). Therefore, in the present example, the engagement members 116 on one limb 114-1 can be provided substantially directly opposite with respect to the engagement members 116 on the other limb 114-2, i.e., in a parallel configuration with respect to each other when viewed in a cross-sectional view. In the present example, each limb 114-1 and 114-2 can be understood to have two or more sets of engagement members 116, each set cantilevered to the respective limb 114-1, 114-2. In an example, each limb 114-1, 114-2 can have two sets of engagement members 116 extending from the limb 114-1, 114-2 in the opposite directions.

Figure 5A:
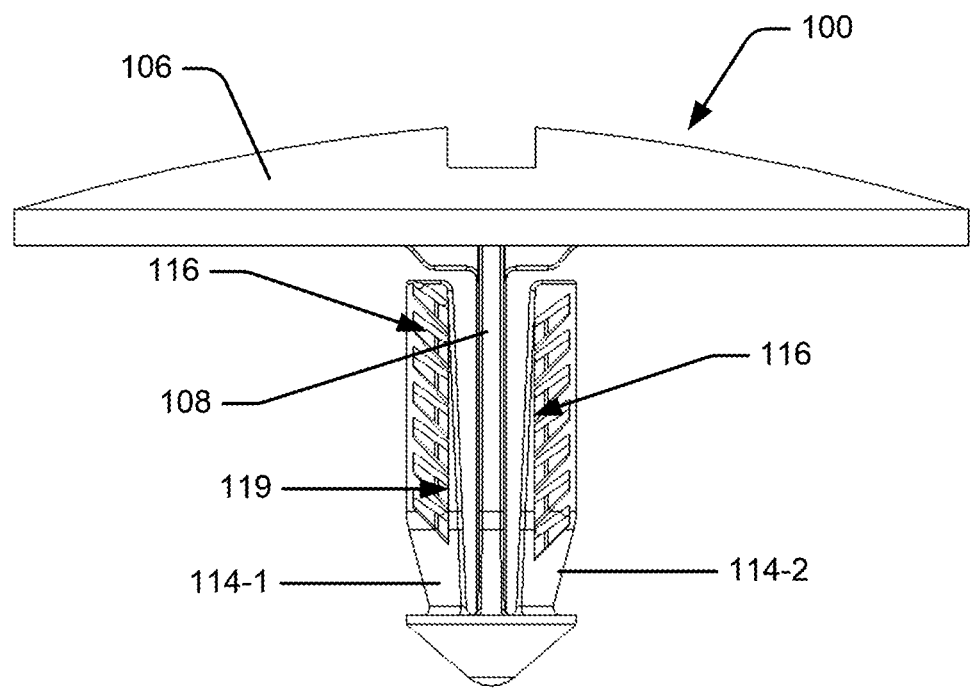
Figure 5B:
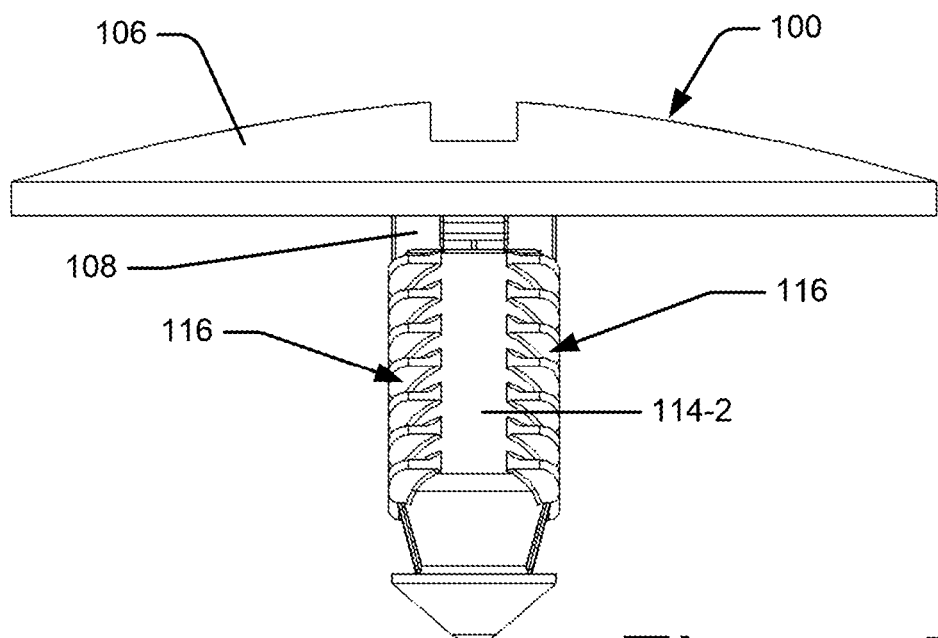
Figure 5C:
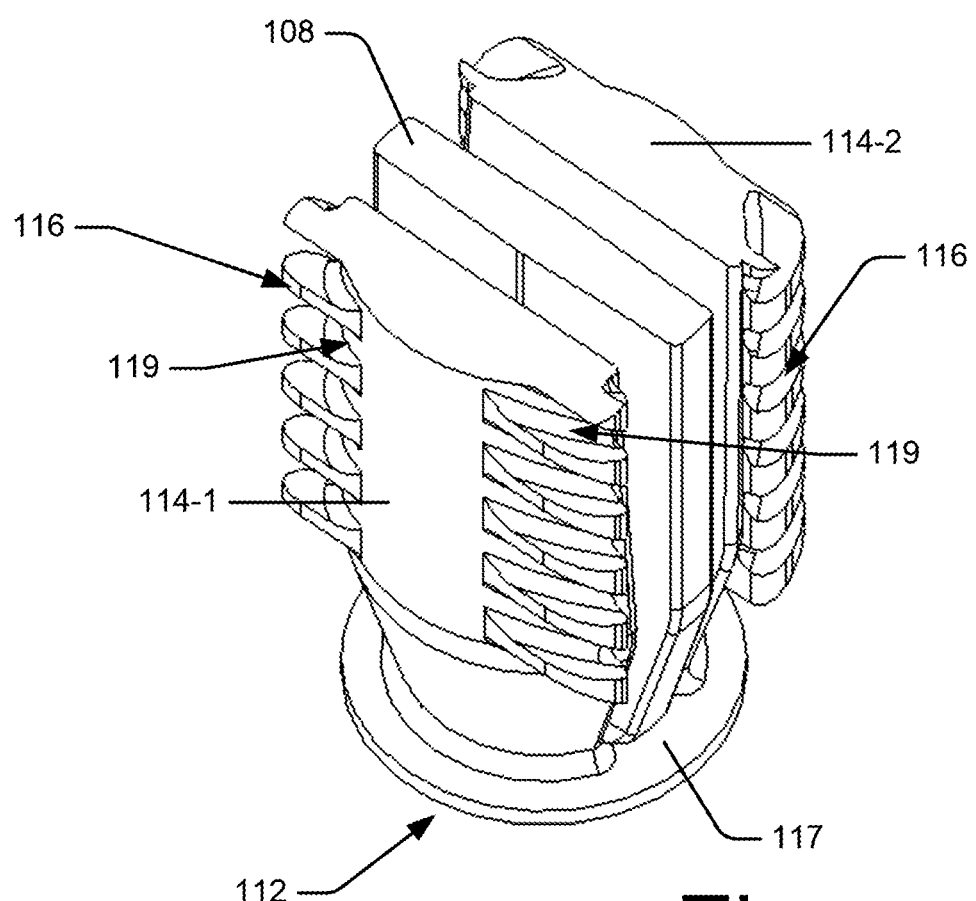

FIGS. 5A, 5B, and 5C illustrate a fourth example of the fastener 100 in which, in contrast to the example shown in FIGS. 4A, 4B, and 4C, at the points of connection of the limbs 114-1, 114-2, the material is removed to provided higher flexibility to the limbs 114-1, 114-2 with respect to the shank 108. The engagement members 116, in the present example, can also be in the form of the inverted tree structure but parallel to each other, as explained above with reference to FIGS. 4A to 4C.

In the examples shown in FIGS. 2A to 5C, the fastener has been shown to have two limbs 114-1, 114-2 which are provided diametrically opposite to each other about the shank 108. In other examples, however, there can be any other number of limbs 114. For instance, the fastener may include three limbs 114 which can be spaced apart at 120 degrees from each other about the shank 108 or may include four limbs 114 which can be spaced apart at 90 degrees with respect to each other about the shank 108. In said examples, depending on the size of the fastener 100 and the force requirements of assembly and disassembly, the number and size of the limbs 114 can be adequately selected.

Figure 6A:
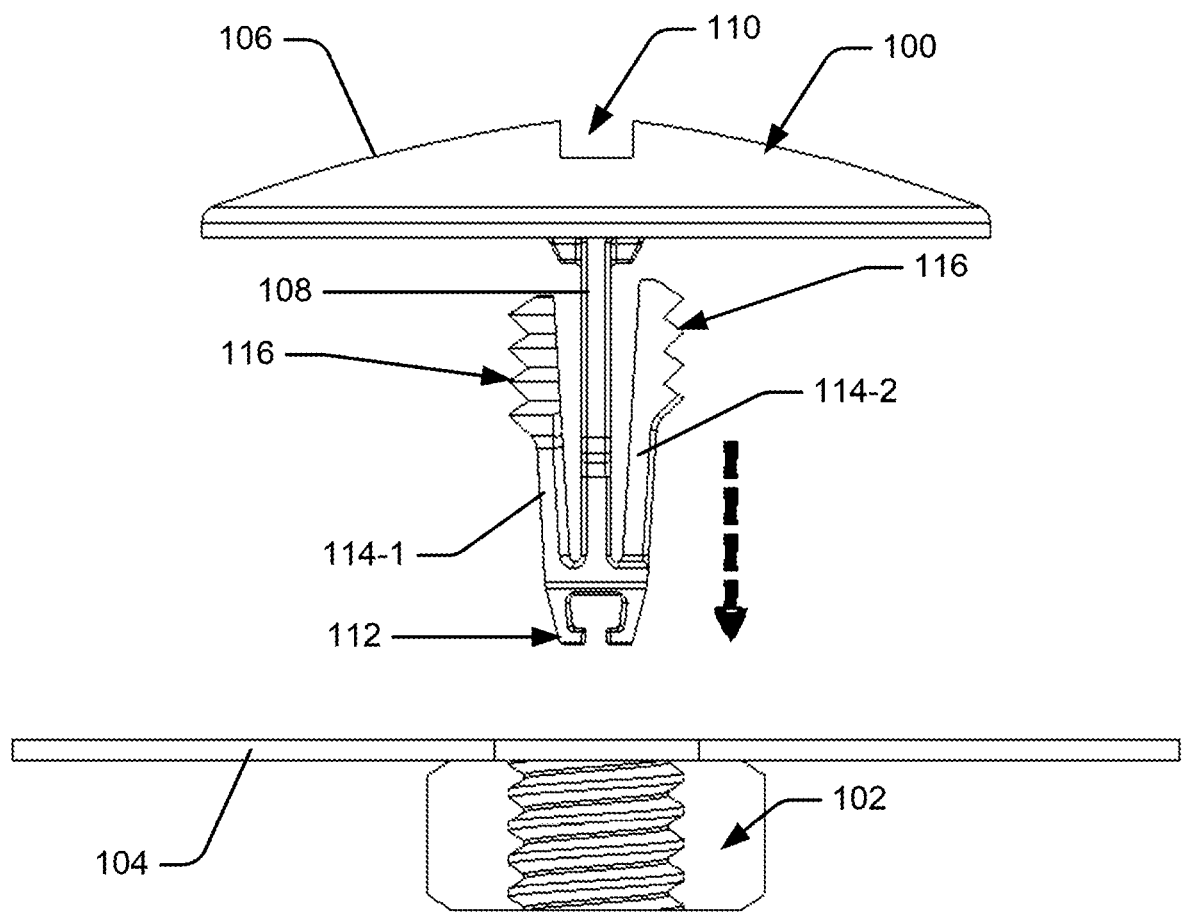
FIGS. 6A, 6B, 6C, and 6D illustrate various stages of assembly and disassembly of the fastener, according to examples of the present subject matter.
Figure 6B:
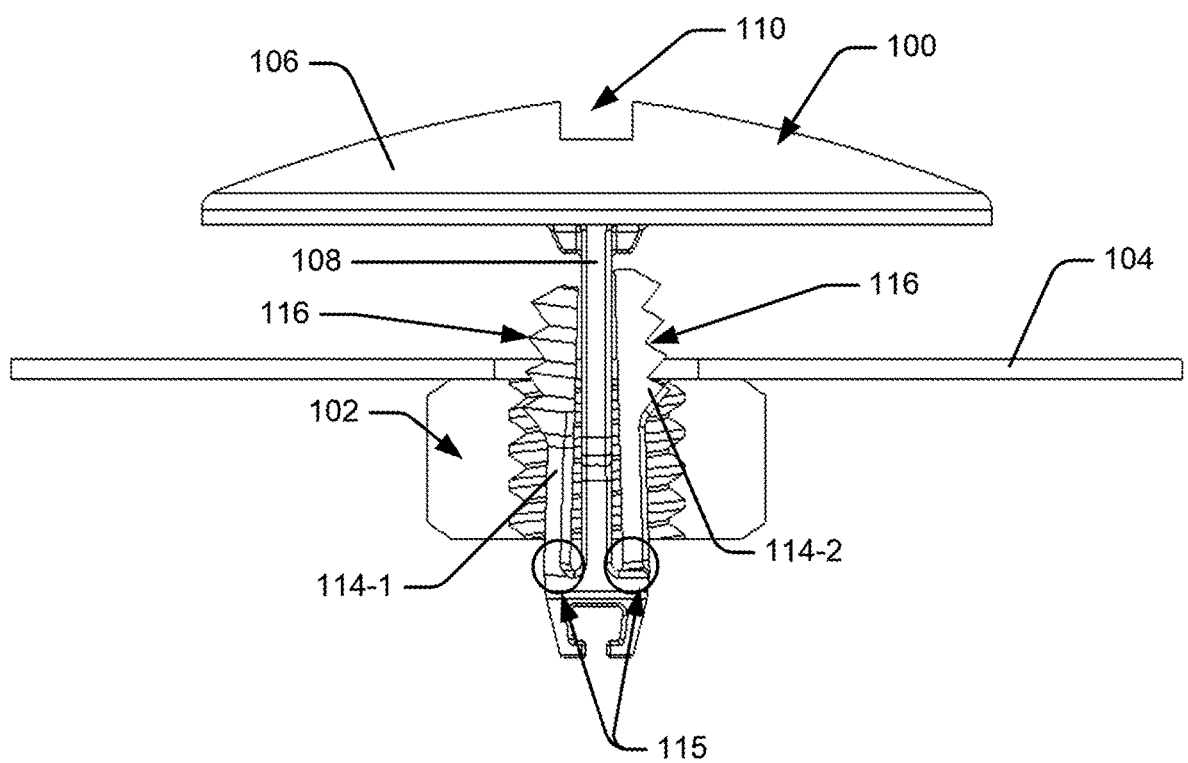
Figure 6C:
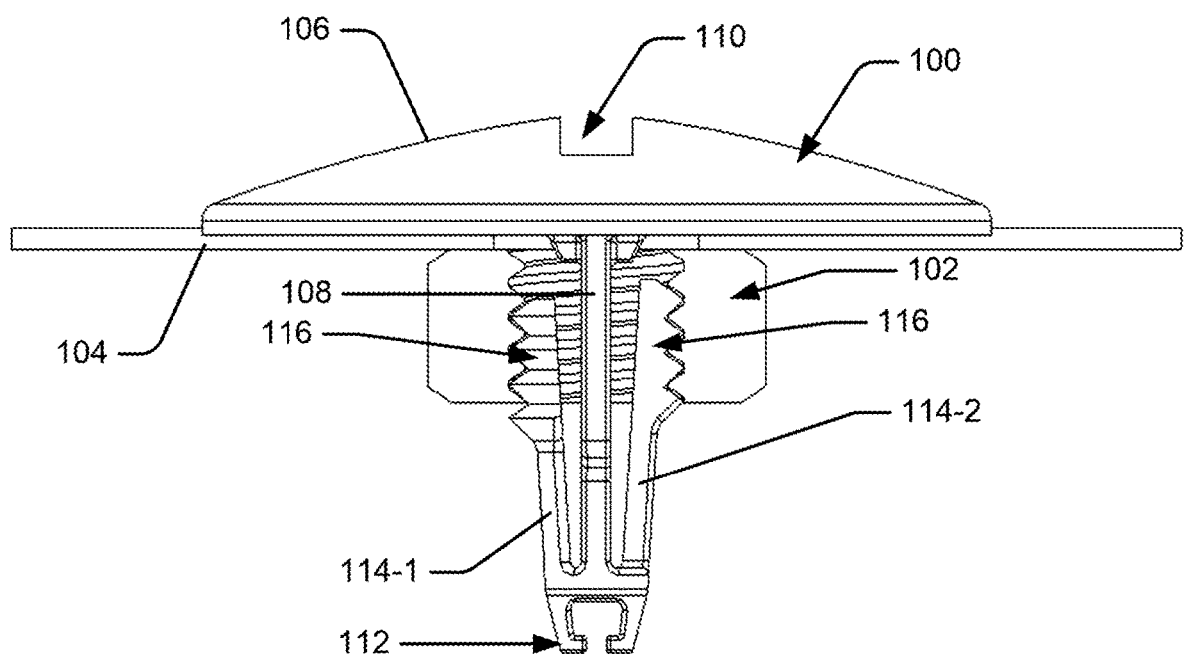
Figure 6D:
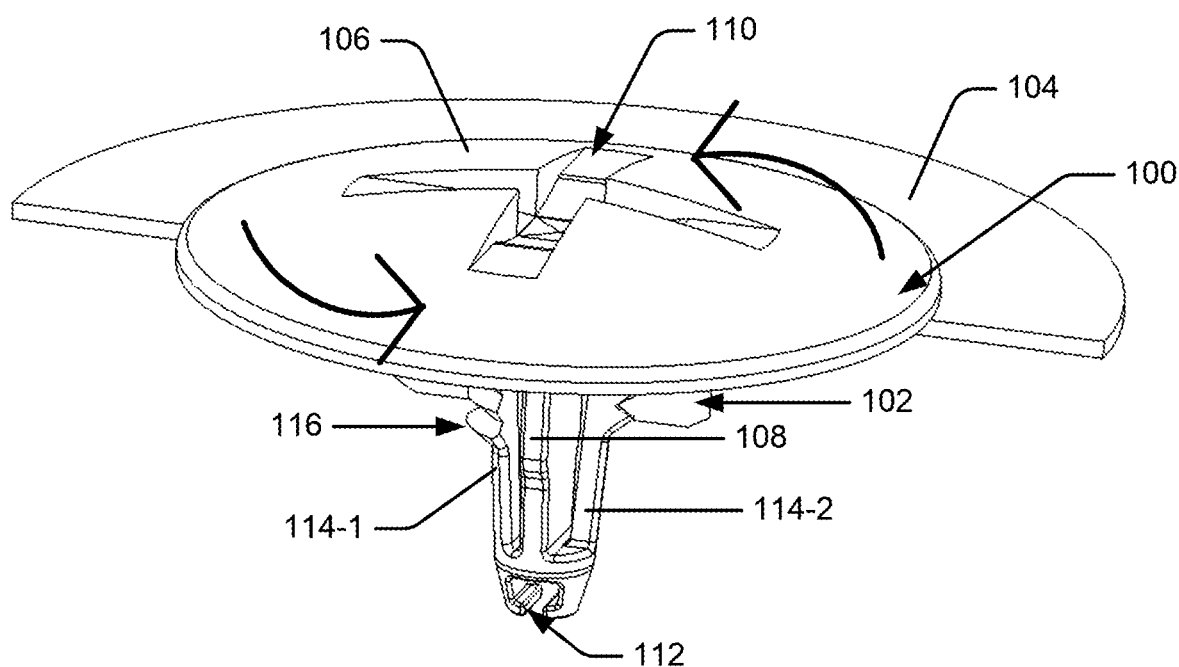

FIG. 6A to 6D illustrate the various stages of assembly and disassembly of the fastener 100 to the threaded element 102, according to the examples of the present subject matter as described above. FIG. 6A illustrates a direction of assembly of the fastener 100 being inserted into the threaded element 102. FIG. 6B illustrates a semi-assembled state in which the limbs 114-1, 114-2 flex inwards, towards the shank 108, by virtue of the design of the point of connection 115 of the limbs 114-1, 114-2 to the shank 108. FIG. 6C illustrates the assembled condition of the fastener 100 where the engagement members 116 of the fastener 100 are engaged with the internal threads of the threaded element 102. FIG. 6D illustrates a direction of rotation in which the fastener 100 can be rotated (in a manner similar to the disengagement of a screw) to cause the engagement members 116 to move along the internal threads and to withdraw the fastener 100 from the threaded element 102.

Although examples for fasteners have been described in language specific to structural features and/or methods, it is to be understood that the appended claims are not limited to the specific features described. Rather, the specific features are disclosed as examples of fasteners.

We claim:

1. A fastener comprising:
 a head;
 a shank coupled to the head and extending along a central axis of the fastener, the shank forming a tapered nose at an end opposite from the head, wherein the shank has a cross-sectional shape that is rectangular or S-shaped; and
 a plurality of engagement members disposed on a peripheral surface of the shank and connected to the shank at a point of connection to project away from the shank, the plurality of engagement members to collectively act as external threads, wherein the plurality of engagement members are flexible with respect to the shank to be relatively moveable with respect to the shank, the plurality of engagement members having a plurality of ends spaced apart from a lowermost surface of the head in an axial direction to define a gap therebetween.

2. The fastener as claimed in claim 1, wherein the shank comprises a plurality of limbs cantilevered to the shank at the nose and extending towards the head, the plurality of limbs running substantially parallel to the shank and substantially equidistant from each other about the shank, wherein the plurality of engagement members are disposed on a peripheral surface of each of the plurality of limbs.

3. The fastener as claimed in claim 2, wherein each of the plurality of limbs is flexible with respect to the shank of the fastener and the plurality of engagement members is fixed onto the plurality of limbs.

4. The fastener as claimed in claim 2, wherein each of the plurality of limbs is inflexible with respect to the shank of the fastener and each engagement member is flexible with respect to a limb from amongst the plurality of limbs that the engagement member is mounted to.

5. The fastener as claimed in claim 2, wherein each of the plurality of limbs is flexible with respect to the shank of the fastener and each engagement member is flexible with respect to a limb from amongst the plurality of limbs that the engagement member is mounted to.

6. The fastener as claimed in any of claim 4 or 5, wherein each of the plurality of limbs comprises at least two sets of engagement members extending from the point of connection on the limb in opposite directions.

7. The fastener as claimed in any of claim 4 or 5, wherein each engagement member is cantilevered at a point of connection to the limb to flex with respect to the point of connection.

8. The fastener as claimed in of claim 1, 4, or 5, wherein the plurality of engagement members extend in a direction of the head to form an inverted tree structure.

9. The fastener as claimed in claim 1, 4, or 5, wherein the plurality of engagement members are in two diametrically opposite sets.

10. The fastener as claimed in claim 9, wherein the engagement members in the two diametrically opposite sets are in a diagonally offset configuration with respect to each other.

* * * * *